(12) United States Patent
Watanabe

(10) Patent No.: US 6,460,998 B1
(45) Date of Patent: Oct. 8, 2002

(54) ADJUSTMENT MECHANISM AND PROJECTOR EMPLOYING THE SAME

(75) Inventor: Nobuo Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/517,460

(22) Filed: Mar. 2, 2000

(30) Foreign Application Priority Data

Mar. 8, 1999 (JP) .......................................... 11-060461

(51) Int. Cl.[7] .......................... G03B 21/14; G03B 21/22; G02F 1/1333
(52) U.S. Cl. .............................. 353/20; 353/119; 349/58
(58) Field of Search .......................... 353/119, 20, 122; 349/9, 58

(56) References Cited

U.S. PATENT DOCUMENTS 5,988,818 A * 11/1999 Fujimori et al. ............ 353/119
6,000,802 A * 12/1999 Hashizume et al. .......... 353/38
6,128,183 A * 10/2000 Uchiyama et al. .......... 361/681
6,199,987 B1 * 3/2001 Haba et al. .................... 353/34
2001/0050732 A1 * 12/2001 Okamoto et al. ............. 349/58

FOREIGN PATENT DOCUMENTS

JP           249427      9/1993   ............. G02F/1/13
JP           10-161107   6/1998   ......... G02F/1/1335

* cited by examiner

Primary Examiner—Russell Adams
Assistant Examiner—Melissa Koval
(74) Attorney, Agent, or Firm—Oliff & Berridge PLC

(57) ABSTRACT

The invention provides a projector which results in good contrast and high luminance by fine-adjusting a polarizer. The projector includes a polarizer angle adjustment mechanism in which a first frame arranged in the vicinity of an electrooptic device pivotally supports a second frame having a polarizer thereon. The second frame is pivoted by an adjustment member so that it can turn properly. By properly using the adjustment member, the polarization axes of the polarizer can be optimumly set, and a high-contrast and high-luminance image is thus presented.

18 Claims, 12 Drawing Sheets

ADJUSTMENT MECHANISM AND PROJECTOR EMPLOYING THE SAME

BACKGROUND OF THE INVENTION

1. Field of Invention

The present invention relates to a projector which includes a light source, an electrooptic device which forms, with an optical modulation element, an optical image from light emitted from the light source in accordance with image information, a projection lens for enlarging and projecting the image formed by the electrooptic device, and an optical polarizing element. More particularly, the present invention relates to an adjustment mechanism for adjusting a mounting angle of the optical polarizing element and a projector including the adjustment mechanism.

2. Description of Related Art

Projectors are conventionally known which include a light source, an electrooptic device for forming an optical image from light emitted from the light source in accordance with image information, and a projection lens for enlarging and projecting the image formed by the electrooptic device.

Such a projector finds widespread use in a multi-media presentation in conferences, meetings of academic societies, exhibitions, etc.

In a multi-media presentation, a vast quantity of information needs to be conveyed to an audience in a short period of time, and easy-to-see and fine video information needs to be presented at the same time.

In connection with the quality of images presented, preciseness is required of the images so as not to create discontinuities and deformation in presented symbols and drawings, while high contrast and high luminance are required at the same time to achieve an easy-to-see and nice image.

To this end, a projector using polarized light has to precisely control the direction of polarization of the light. For example, it is necessary to set the angle formed by the polarization axes of both an input-side polarizer and an output-side polarizer which are disposed so as to sandwich an electrooptic device (for instance, a liquid-crystal panel) therebetween, to set the angle of the polarization axis of each of the input-side and output-side polarizers, or to set the angle of an optical axis of a wavelength plate to an optimal angle for the thickness of a layer and an orientation of electrooptic material (for instance, a liquid crystal), of the electrooptic device, which controls optical modulation.

The polarizers and wavelength plates are typically designed so that their polarization axes and optical axes are precisely set as long as they are mounted referring to their external shapes. When they are bonded onto the surface of a glass substrate or a prism, their external shapes serve as a reference. However, there are times when the relationship between the external shape of a polarizer or a wavelength plate and its polarization axis or optical axis is in error. In such a case, even if the polarizer or the wavelength plate is most accurately mounted, there will occur a deviation in the polarization axis or the optical axis, and no optimum angle will be set.

As a result, a display image transmitted through a projection lens is subject to a subtle blur or bleeding, and high contrast and high luminance are not achieved.

SUMMARY OF THE INVENTION

The invention provides a projector which fine-adjusts the mounting position of a polarizer or a wavelength plate to achieve high contrast and high luminance. The projector includes an adjustment mechanism for adjusting a mounting angle of an optical polarizing element and includes two frames and an adjustment member. The optical polarizing element may be supported by one of the two frames. The one of the two frames is pivotally supported on an axis of pivot so that it can turn with respect to the other of the two frames. The adjustment member secures the two frames, and one of the two frames is pivoted about the axis of pivot with respect to the other of the two frames through the adjustment operation of the adjustment member. In accordance with the adjustment mechanism of the present invention, the angle of the polarization axis or the optical axis is optimumly adjusted by adjusting a mounting angle of the optical polarizing element, such as the polarizer or the wavelength plate. By properly adjusting the adjustment member, the angle of the polarization axis or the optical axis of the optical polarizing element such as the polarizer is adjusted to an optimum angle.

In a projector having a light source, an electrooptic device for forming an optical image from light emitted from the light source in accordance with image information, and a projection lens for enlarging and projecting the image formed by the electrooptic device may be provided. An adjustment mechanism of the present invention serves as an adjustment mechanism to adjust the mounting angle of an optical polarizing element interposed between the light source and the electrooptic device, or to adjust the mounting angle of an optical polarizing element interposed between the electrooptic device and the projection lens.

In accordance with the projector employing the adjustment mechanism of the present invention, the angle of the polarization axis or the optical axis is adjusted to an optimum angle by adjusting the mounting angle of the optical polarizing element, such as the polarizer or the wavelength plate, and a high-contrast and high-luminance image is thus presented.

Preferably, the adjustment member is a screw, and the screw is screwed into one of the two frames while being loosely inserted through the other of the two frames. Through a simple operation, such as rotating the screw, the angle adjustment of the optical polarizing element is properly performed.

Preferably, the frame through which the screw is inserted includes a loose engagement portion, and the screw has a shoulder portion that is provided to hold the loose engagement portion between a head of the screw and the shoulder portion of the screw. With this arrangement, a displacement of the screw is absorbed by the loose engagement portion. Specifically, no mutual distortion takes place between the screw and the frame through which the screw is inserted, and the screw smoothly rotates. Since the axial motion of the screw is restrained by the head and the shoulder portion of the screw, the screw is prevented from coming off.

When the direction of the axis of the screw which is an adjustment member is aligned with the tangential direction of the trajectory of the pivotal motion of the second frame, the reciprocal movement of the screw is directly converted into a rotary motion of the second frame without any component that conveys the stroke of the screw, and the construction surrounding the adjustment member is thus simplified.

In the adjustment mechanism thus constructed, preferably, one of the first and second frames has a projection toward the other of the two frames, the other of the two frames has a recess formed in order for the projection to engage there, and the one of the two frames is pivotally supported by the other of the two frames through the engagement of the recess and the projection. This is because a simple structure of the projection and the recess presents a mechanism in which the second frame is pivotally supported, and the parts are easily machined.

Preferably, the one of the two frames has flange portions, and elastic members for pressing the optical polarizing element with elasticity is interposed between the flange portions and the end faces of the optical polarizing element. With this arrangement, the optical polarizing element is affixed to the frame without using any adhesive agent. Therefore, there is no fear of an adhesive agent flowing out onto and sticking to a light incident surface of the optical polarizing element, and no fear of light incident on the optical polarizing element being disturbed.

The adjustment mechanism having the above structure preferably includes a clamping member for clamping the first and second frames together. With this arrangement, the two frames are affixed together so that they are not separated.

Preferably, the projector having the above adjustment mechanism includes a case for covering the adjustment mechanism provided on the light incident side of the electrooptic device, and an opening is formed at a location of the case facing the adjustment member. With this arrangement, the mounting angle of the polarizer optical element is adjusted without the need for demounting the case.

If the case is integrally formed with one of the two frames, the manufacturing step of separately producing the frame is omitted, and the manufacturing cost is reduced.

DETAILED DESCRIPTION OF PREFERRED EMBODIMENTS

Figure 1:
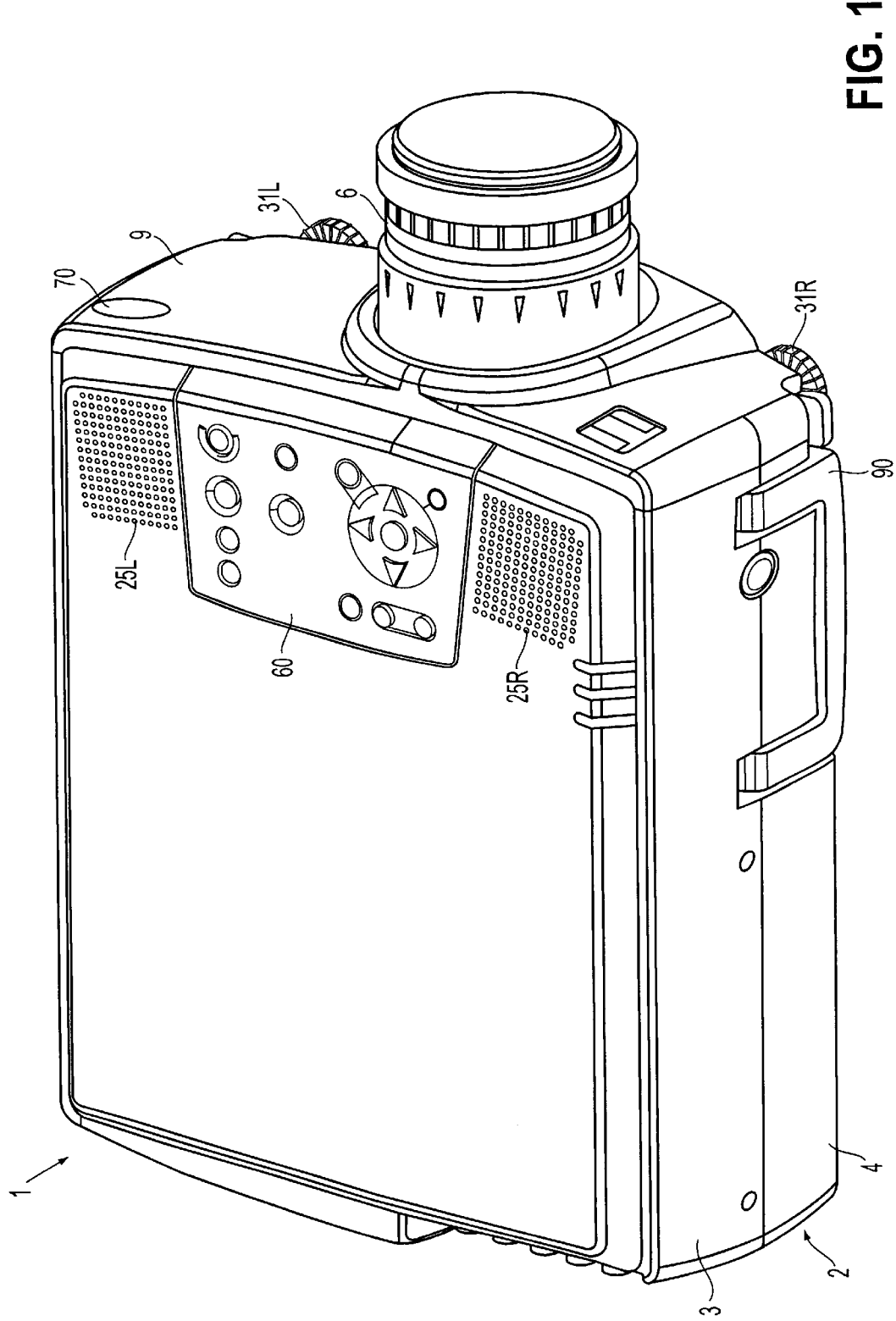
FIG. 1 is a perspective view of the external appearance, viewed from above, of a projector of an embodiment of the present invention.

One embodiment of the present invention is now discussed, referring to the drawings.

(1) General Structure of Projector

Figure 2:
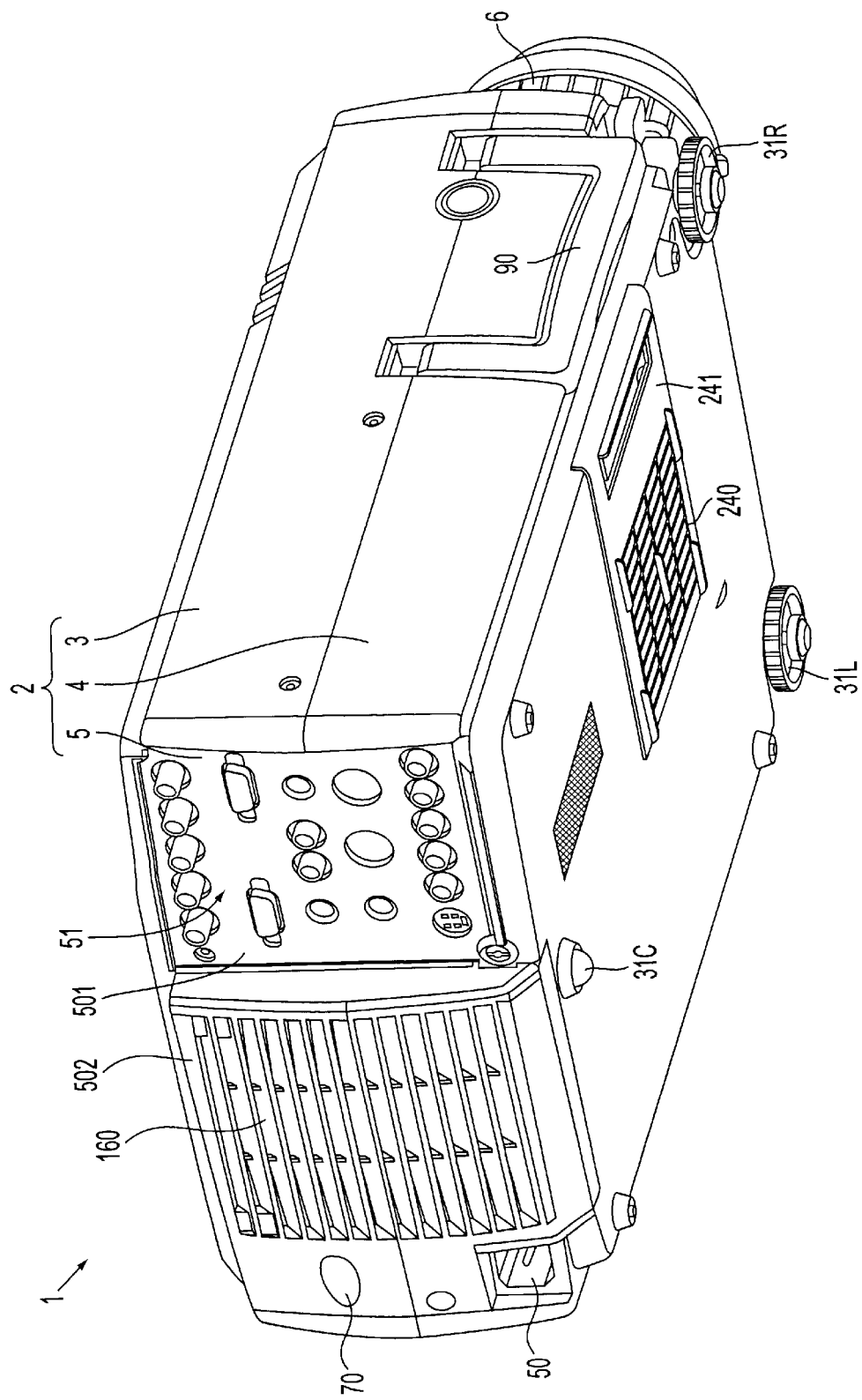
FIG. 2 is a perspective view of the external appearance viewed from below, of the projector of the embodiment.

FIG. 1 and FIG. 2 are perspective views roughly showing a projector 1 of this embodiment, FIG. 1 is the perspective view viewed from above, and FIG. 2 is the perspective view viewed from below.

The projector 1 separates light emitted from a light source lamp as a light source into the three primary colors of light of red (R), green (G), and blue (B), the respective color light beams are modulated with image information through liquid-crystal panels constituting an electrooptic device. The respective three primary color light beams that have been modulated are synthesized by a prism (an optical color synthesis system) into a color image, and the color image is then enlarged and projected onto a projection surface through a projection lens 6. Constituent parts except some parts of the projection lens 6 are housed in an outer case 2.

(2) Structure of Outer Case

The outer case 2 basically includes an upper case 3 covering the top surface of the projector 1, a front case 9 covering the front of the projector 1, a lower case 4 forming the bottom of the projector 1, and a rear case 5 (FIG. 2) covering the back of the projector 1. The rear case 5 is constructed of resin while all other cases are constructed of a metal such as magnesium.

Referring to FIG. 1, a number of through holes for loudspeakers 25R and 25L are formed on the top surface of the upper case 3 on both right and left forward end corner portions. Arranged between the through holes 25R and 25L is an operation panel 60 for adjusting image quality on the projector 1.

The projection lens 6, for enlarging and projecting a modulated luminous flux, is mounted on the front case 9 slightly offset to the left from the center. A light receiving unit 70, for receiving an optical signal from an unshown remote controller, is mounted on the front case 9 on the top right portion.

Referring to FIG. 2, an air inlet 240, for taking in cooling air for cooling the inside of the projector 1, is arranged substantially in the center of the bottom surface of the lower case 4. The air inlet 240 is provided with a filter replacement resin cover 241, and by sideways detaching or attaching the filter replacement cover 241, an internal filter can be replaced.

Also arranged on the bottom surface of the lower case 4 are feet 31R and 31L on the front right and left corners, and a foot 31C at the center of the back end portion. By adjusting the vertical extensions of the feet 31R and 31L, the inclination of the display screen of the projector 1 can be adjusted.

As shown in FIG. 2, an AC inlet 50 for receiving external power and a group 51 of various input and output terminals are arranged on the rear case 5, and an air outlet 160, for discharging the air from within the projector 1, is arranged in the vicinity of the input and output terminal group 51. A light receiving unit 70 is also arranged on the rear case 5 as on the upper case 3.

(3) Internal Structure of the Projector 1

Figure 3:
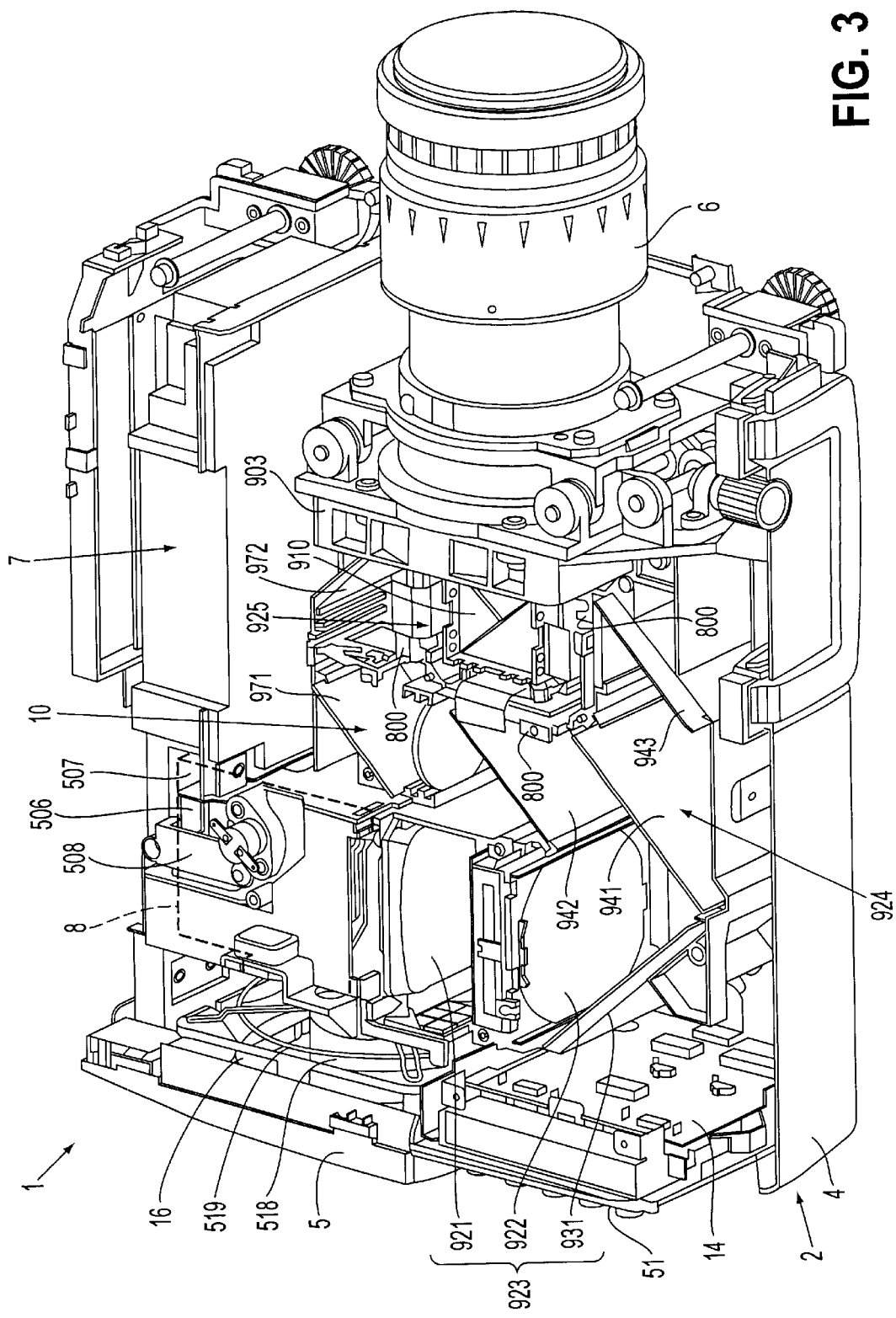
FIG. 3 is a perspective view of the internal structure of the projector of the embodiment.

FIG. 3 shows the internal structure of the projector 1. As shown, the projector 1 houses inside a power source unit 7 arranged on one side of the projection lens 6, a light source lamp unit 8 arranged as a light source unit behind the power source unit 7, an optical unit 10 forming an optical system, a driver board (not shown) for driving an electrooptic device 925 in the optical unit 10, and a main board (not shown) for controlling the entire projector 1.

The power source unit 7 transforms power from the AC inlet 50 and supplies power to the light source lamp unit 8, the driver board, the main board, suction fans (not shown) arranged under the electrooptic device 925 or both under and over the electrooptic device 925, and a discharge fan 16 arranged behind the power source lamp unit 80. The power source unit 7 includes a power circuit board on which a power source filter, a transformer, a rectifier circuit, a smoothing circuit, and a voltage regulator circuit are formed. The power source unit 7 further includes a lamp driver board for driving a light source lamp 181 of the light source lamp unit 8.

Figure 4:
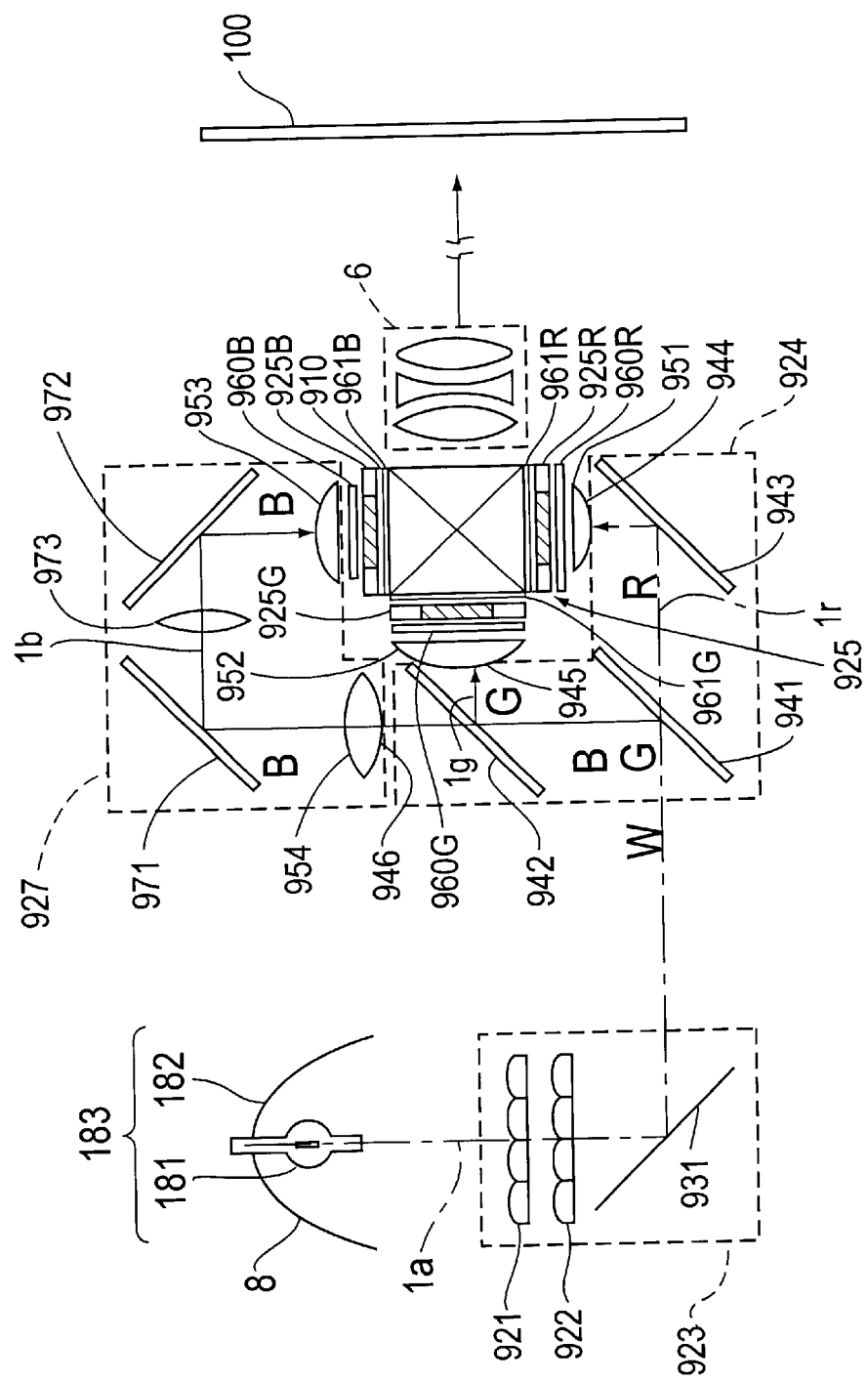
FIG. 4 is a block diagram showing the structure of an optical system of the embodiment.

The light source lamp unit 8 forms a light source section of the projector 1, and includes a light source device 183 composed of the light source lamp 181 and a reflector 182, and a lamp housing that houses the light source device 183, as shown in FIG. 4. The light source lamp unit 8 is cooled by cooling air delivered from the suction fan and cooling air sucked through gaps between the outer case 2 and the projection lens 6. The cooling air, immediately after being drawn in, cools first the electrooptic device 925, the power source unit 7, etc., then flows rearward to cool substantially the entire inside of the projector 1, and finally, most of the cooling air is discharged through inside the light source lamp unit 8 by the discharge fan 16 on the back. Since the light source lamp unit 8 is arranged in immediate front of the discharge fan 16, the inside of the light source device 183 is efficiently cooled by a large quantity of cooling air.

The optical unit 10 is a unit for optically processing the light emitted from the light source lamp unit 8 and forming an optical image in accordance with image information, and includes an optical illumination system 923, an optical color separation system 924, the electrooptic device 925, and a prism unit 910 as an optical color synthesizing system. The optical elements of the optical unit 10, other than the electrooptic device 925 and the prism unit 910, are secured between upper and lower light guides (not shown), serving as a case, from below and from above. The upper light guide and the lower light guide are assembled to be a unitary structure and are secured to the lower case 4 with fixing screws. These light guides are also secured to the prism unit 910 with fixing screws.

Figure 5:
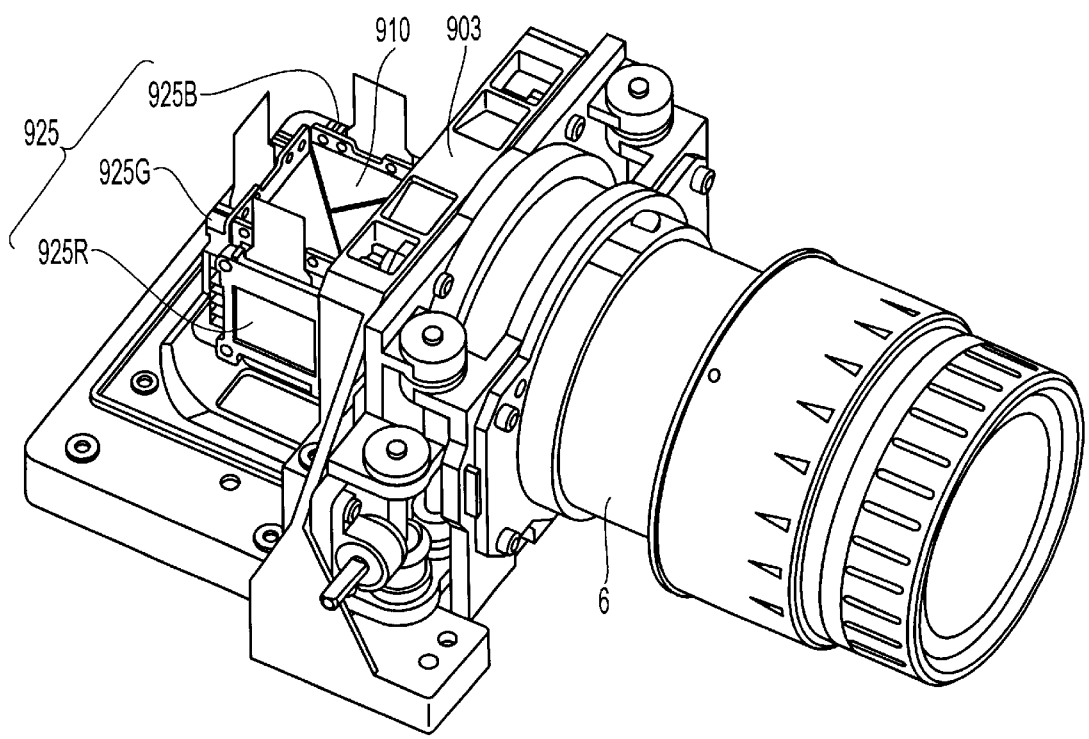
FIG. 5 is a perspective view showing the constituent parts of the embodiment.

Referring to FIG. 5, the rectangular parallelopiped prism unit 910 is secured, with fixing screws, to a unitary molded head body 903 constructed of magnesium and having a substantially L shape in cross section, if viewed from side. Liquid-crystal panels 925R, 925G, and 925G constituting the electrooptic device 925 are respectively affixed to the three sides of the prism unit 910 with fixing members.

The driver board is used to drive and control the liquid-crystal panels 925R, 925G, and 925B of the electrooptic device 925, and is arranged over the optical unit 10.

The main board bears a control circuit for controlling the entire projector 1, and is arranged over the driver board. The main board is electrically connected to the above-referenced driver board and the operation panel 60.

(4) Structure of the Optical System

The structure of the optical system of the projector 1, namely, the optical unit 10, is now discussed referring to FIG. 4.

As already discussed, the optical unit 10 includes the optical illumination system 923 for making uniform an in-plane illuminance distribution of the light (W) from the light source lamp unit 8, the optical color separation system 924 for separating the light beam (W) from the optical illumination system 923 into red (R), green (G), and blue (B) light beams, the electrooptic device 925 for modulating the R, G, and B light beams in accordance with the image information, and the prism unit 910 as the optical color synthesizing system for synthesizing the modulated R, G, and B light beams.

The optical illumination system 923 includes a first lens plate 921, a second lens plate 922 disposed on the output side of the first lens plate 921, and a reflective mirror 931 for bending the optical axis 1a of the light beam W emitted from the light source lamp unit 8 toward the front side of the projector 1.

The first lens plate 921 includes a plurality of rectangular lenses arranged in a matrix, divides the light beam emitted from the light source into a plurality of sub-beams, and condenses respective sub-beams in the vicinity of the second lens plate 922.

The second lens plate 922 includes a plurality of rectangular lenses arranged in a matrix, and has the function of overlapping the respective sub-beams coming from the first lens plate 921 on the liquid-crystal panels 925R, 925G, and 925B (to be discussed later) constituting the electrooptic device 925.

Since the projector 1 illuminates the liquid-crystal panels 925R, 925G, and 925B with substantially uniform illuminance light through the optical illumination system 923 in this way, a projected image that is free from illuminance nonuniformity can be obtained.

The optical color separation system 924 includes a blue/green light reflecting dichroic mirror 941, a green light reflecting dichroic mirror 942, and a reflective mirror 943. The blue/green light reflecting dichroic mirror 941 reflects a blue light beam B and a green light beam G at right angles, which are contained in the luminous flux W emitted from the illumination optical system 923, and the reflected light beams are directed toward the green light reflecting dichroic mirror 942.

A red light beam R is transmitted through the blue/green light reflecting dichroic mirror 941, and is reflected off the downstream reflective mirror 943 at a right angle and is output through a red luminous flux R output portion 944 toward the prism unit 910.

The green light beam G, out of the blue and green light beams which have been reflected off the blue/green light reflecting dichroic mirror 941, is reflected at a right angle by the green light reflecting dichroic mirror 942, and is output through a green light beam G output portion 945 toward the prism unit 910.

The blue light beam B that has been transmitted through the green light reflective dichroic mirror 942 is output to an optical relay system 927 via a blue light beam B output portion 946. In this embodiment, the distances from the output portion for the light beam W in the optical illumination system 923 to the output portions 944, 945, and 946 for the respective light beams R, G, and B in the optical color separation system 924 are set so that all of the distances are equal.

Condenser lenses 951 and 952 are respectively arranged on the output sides of the red and green light beam output portions 944 and 945 in the optical color separation system 924. The red and green light beams R and G output through the respective output portions fall on the condenser lenses 951 and 952 and are collimated therethrough.

The collimated red and green light beams R and G pass through input-side polarizers 960R and 960G and are incident on the liquid-crystal panels 925R and 925G, which are optical modulators, to be modulated there to add image information for the respective color light beams. That is, the liquid-crystal panels 925R and 925G are switching-controlled by the above-referenced driver board, thereby causing respective color light beams passing therethrough to be modulated.

On the other hand, the blue light beam B is guided to the liquid-crystal panel 925B via the optical relay system 927, and is similarly modulated in accordance with the image information. The liquid-crystal panels 925R, 925G, and 925B in this embodiment may be the ones which employ polysilicon TFTs as switching elements.

The optical relay system 927 includes a condenser lens 954 arranged on the output side of the blue light beam B output portion 946, an input-side reflective mirror 971, an output-side reflective mirror 972, an intermediate lens 973 arranged between these reflective mirrors, and a condenser lens 953 arranged in front of the liquid-crystal panel 925B, and the blue light beam B emitted from the condenser lens 953 is transmitted through the input-side polarizer 960B and is incident on the liquid-crystal panel 925B to be modulated there.

In this situation, an optical axis 1$a$ of the light beam W and optical axes 1$r$, 1$g$ and 1$b$ of the respective color light beams R, G, and B are arranged to be formed in the same plane. As for the distance of each color light beam, namely, the distance from the light source lamp 181 to each liquid-crystal panel, the blue light beam B has the longest distance to travel, thus optical loss of the blue light beam B is the largest. With the optical relay system 927 being intervened, however, the optical loss can be reduced.

The color light beams R, G, and B, respectively modulated through the liquid-crystal panels 925R, 925G, and 925B, are incident on the prism unit 910 through output-side polarizers 961R, 961G, and 961B, to be synthesized there. A color image, synthesized by the prism unit 910, is enlarged and projected onto a projection surface 100 placed at a predetermined position through the projection lens 6.

(5) Angle Adjustment Mechanism of the Polarizers

Figure 6:
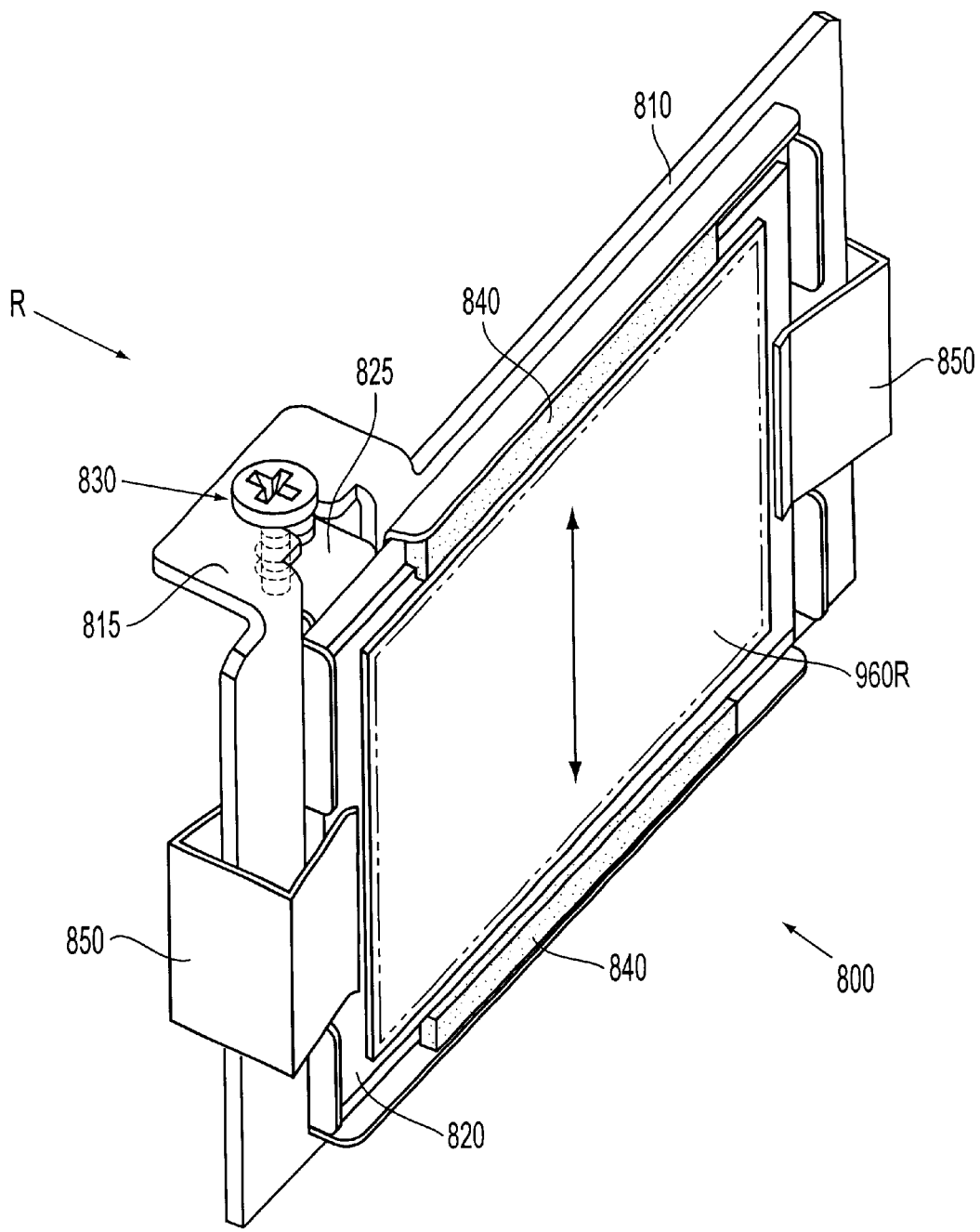
FIG. 6 is a perspective view of a polarizer angle adjustment mechanism, viewed from above, of the projector of the embodiment.

A polarizer angle adjustment mechanism 800, as the adjustment mechanism of the present invention, is mounted on the light incident side of each of the respective liquid-crystal panels 925R, 925G, and 925B as shown in FIG. 3 and FIG. 6.

The polarizer angle adjustment mechanism 800, mounted on the incident side of the liquid-crystal panel 925R, is representatively discussed (because the polarizer angle adjustment mechanisms 800 mounted on the incident sides of the remaining liquid-crystal panels 925G and 925B have identical structure).

Referring to FIG. 6, the polarizer angle adjustment mechanism 800 is the one for fine-adjusting the polarization axis angle of the input-side polarizer 960R, and includes a second frame 820, on which the polarizer 960R is mounted, a first frame 810 pivotally supports the second frame 820, a screw 830 as an adjustment member for adjusting the angular position of the second frame 820 with respect to the first frame 810, and clamping members 850 for clamping the second frame 820 and the first frame 810 together.

Figure 7:
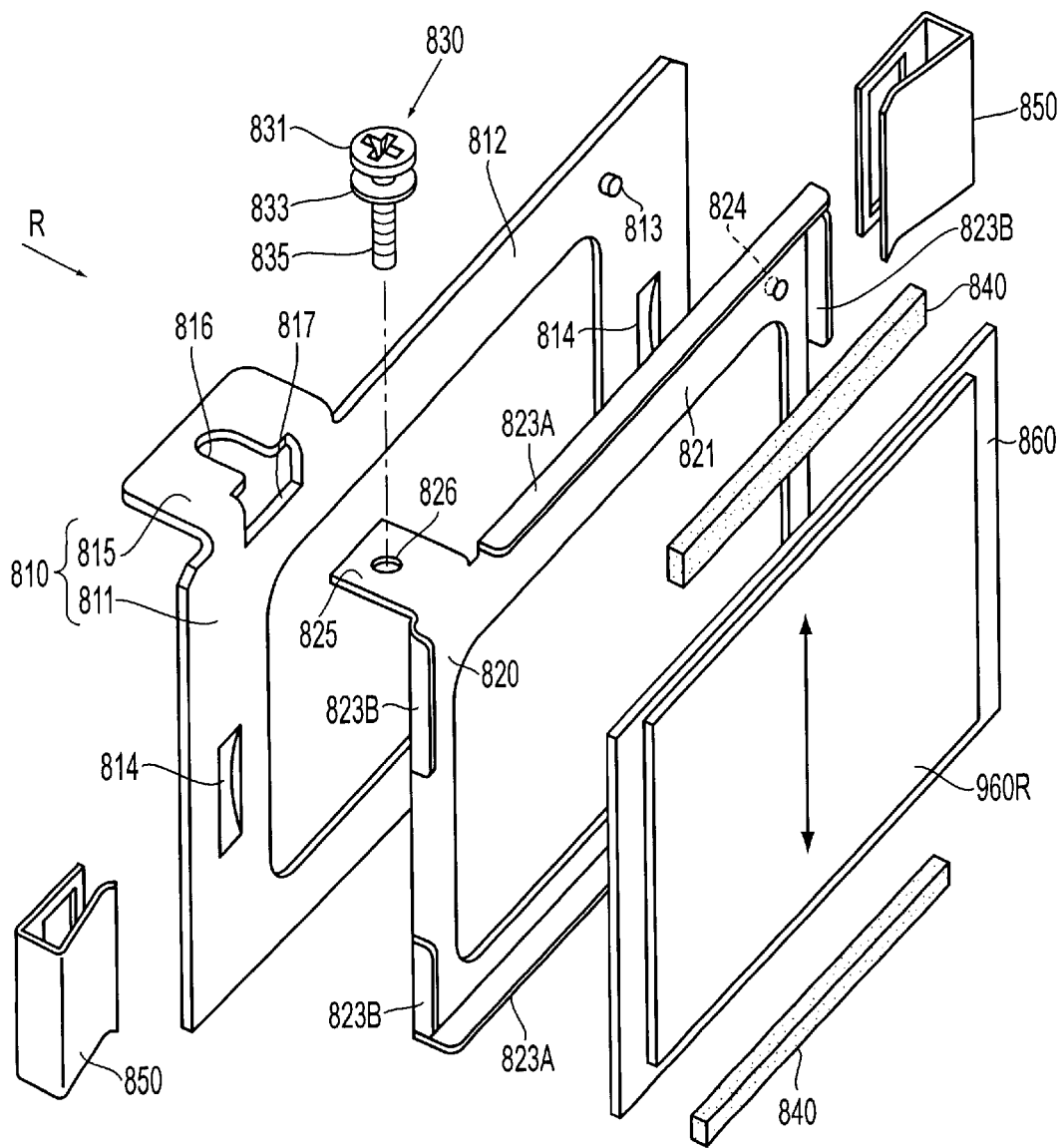
FIG. 7 is an exploded perspective view of the polarizer angle adjustment mechanism of the projector of the embodiment.

As shown in FIG. 7, the first frame 810 includes a body 811 having an opening, and a loose engagement lug 815 that is bent and extends from the long side edge of the body 811. The loose engagement lug 815 includes an elongated loose engagement hole 816, and the loose engagement hole 816 is continuous with a locking opening 817 formed in the body 811. The body 811 has projections 814 on both sides projecting toward the light incident side.

The second frame 820 includes a body 821 on which a glass plate 860 having the input-side polarizer 960R bonded thereon is mounted, and a screw lug 825 having a screw hole 826.

The body 821 has first flange portions 823A on the entire length of each of the long sides, and second flange portions 823B on locations of the short sides which are clear of the clamping members 850. Elastic members 840 pressing the edges of the glass plate 860 on which the input-side polarizer 960R is bonded are engaged with the first flange portions 823A.

Figure 10:
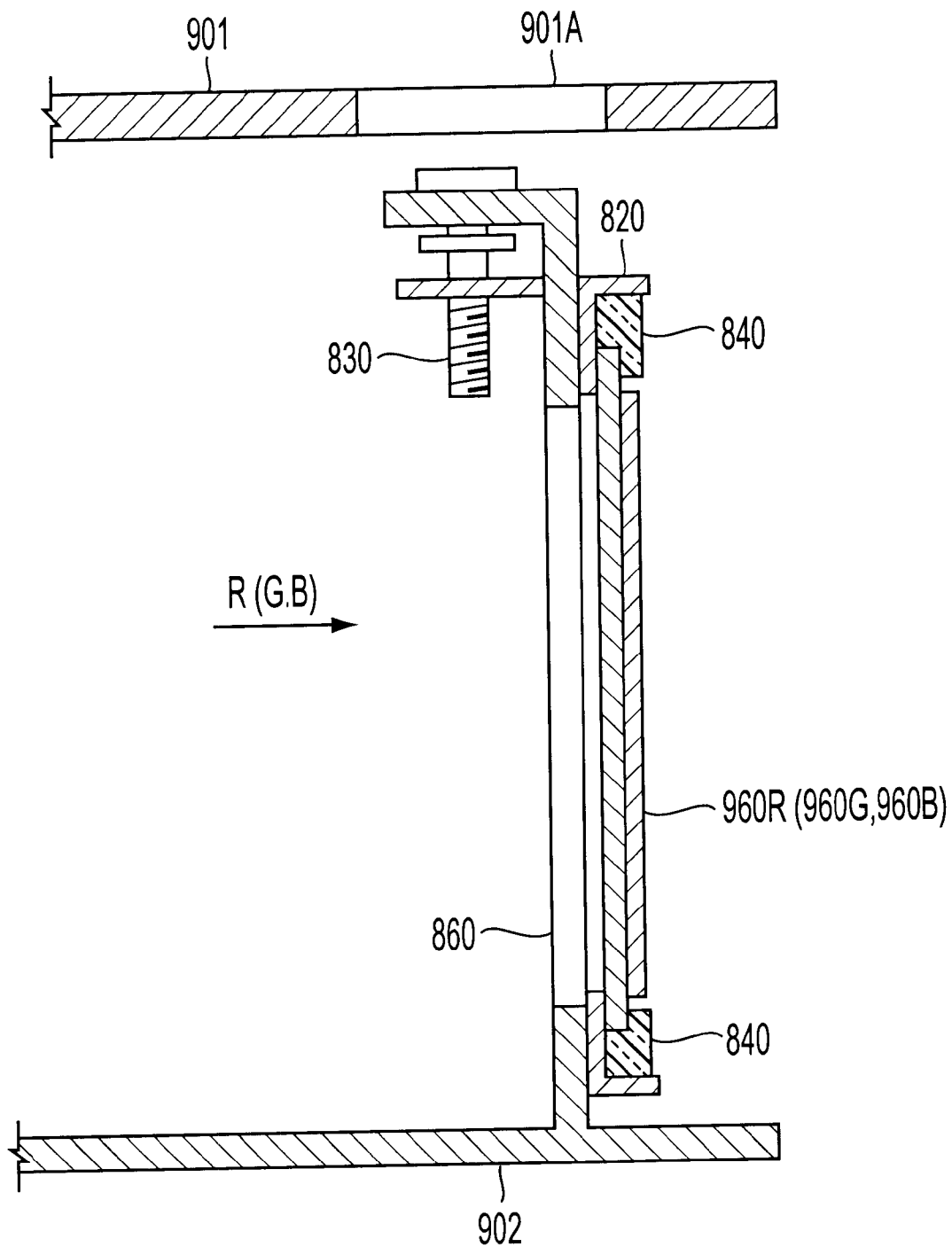
FIG. 10 is a cross-sectional view of the polarizer angle adjustment mechanism of the embodiment.

The screw 830 has a shoulder portion 833 at a position where the length from the top of its head 831 to the shoulder portion 833 is greater than the thickness of the loose engagement lug 815. The screw 830 includes a thread portion 835 having a predetermined pitch and extending to its end from the shoulder portion 833. Referring to FIG. 10, the upper light guide 901 has a small through hole 901A through which a screwdriver is inserted, at a position corresponding to the mounting location of the screw 830. Without the need for demounting the upper light guide 901, the angle of the polarization axis of the polarizer 960R can be adjusted.

The polarizer angle adjustment mechanism 800 having the above structure is assembled as follows.

The glass plate 860 is mounted between the first flanges 823A by pressing the glass plate 860, with the input-side polarizer 960 bonded thereon, between the elastic members 840. After the screw 830 is screwed into the screw hole 826, the loose engagement lug 815 is loosely engaged between the head 831 and the shoulder portion 833 of the screw 830, while a projection 813 is inserted into a recess 824. The screw lug 825 is passed through the locking opening 817, and the body 821 is thus secured to the first frame 810. The projections 814 of the first frame 810 are engaged with openings of the clamping members 850 to firmly hold the first frame 810 and the second frame 820 together.

The polarizer angle adjustment mechanism 800 thus assembled is clamped between the upper light guide 901 and the lower light guide 902, and is then mounted inside the projector 1. The screw 830 of the polarizer angle adjustment mechanism 800 is positioned in alignment with the above-described small hole 901A in the upper light guide 901.

Figure 8A:
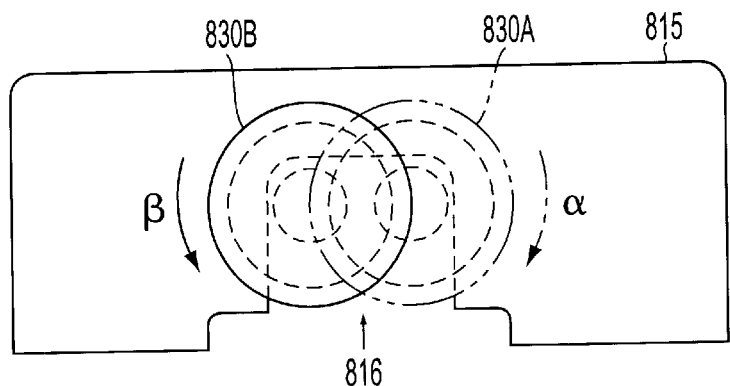
FIG. 8 is an enlarged view of an adjustment member of the polarizer angle adjustment mechanism of the embodiment.
Figure 8:
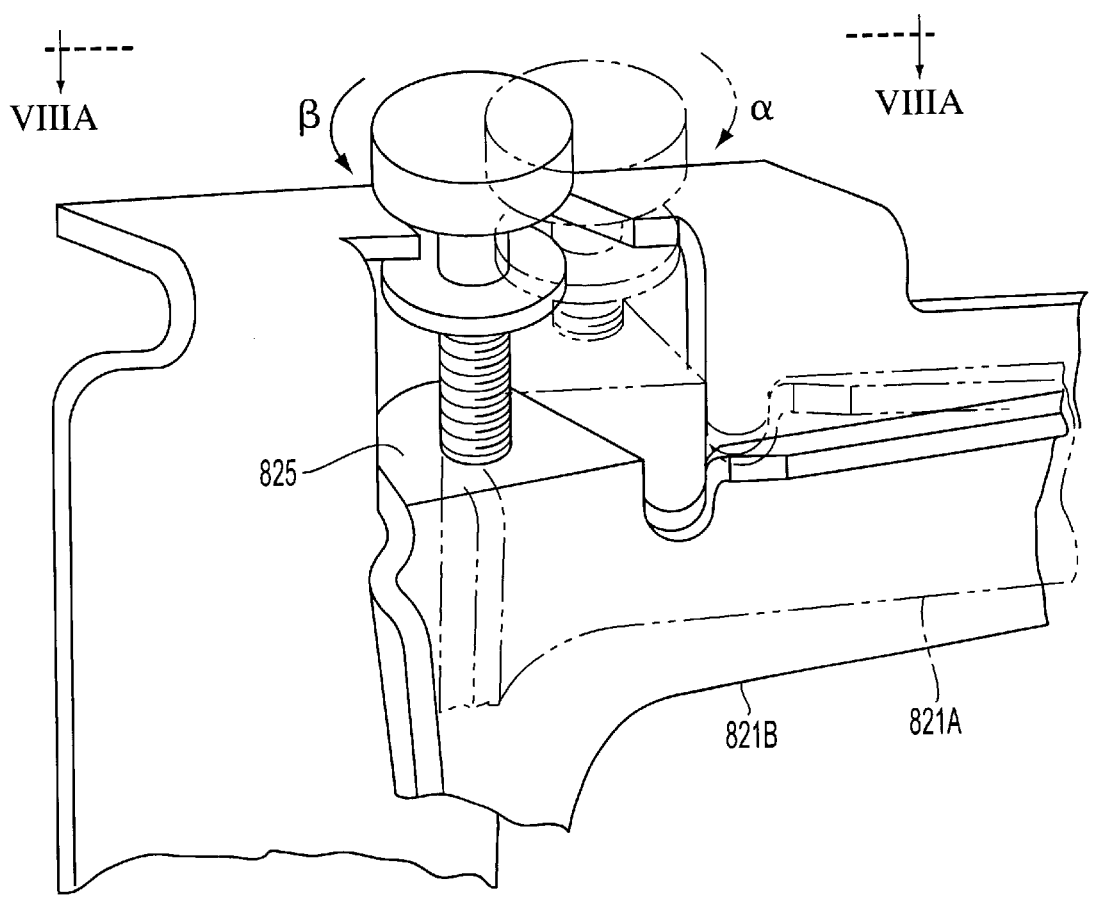
Figure 9:
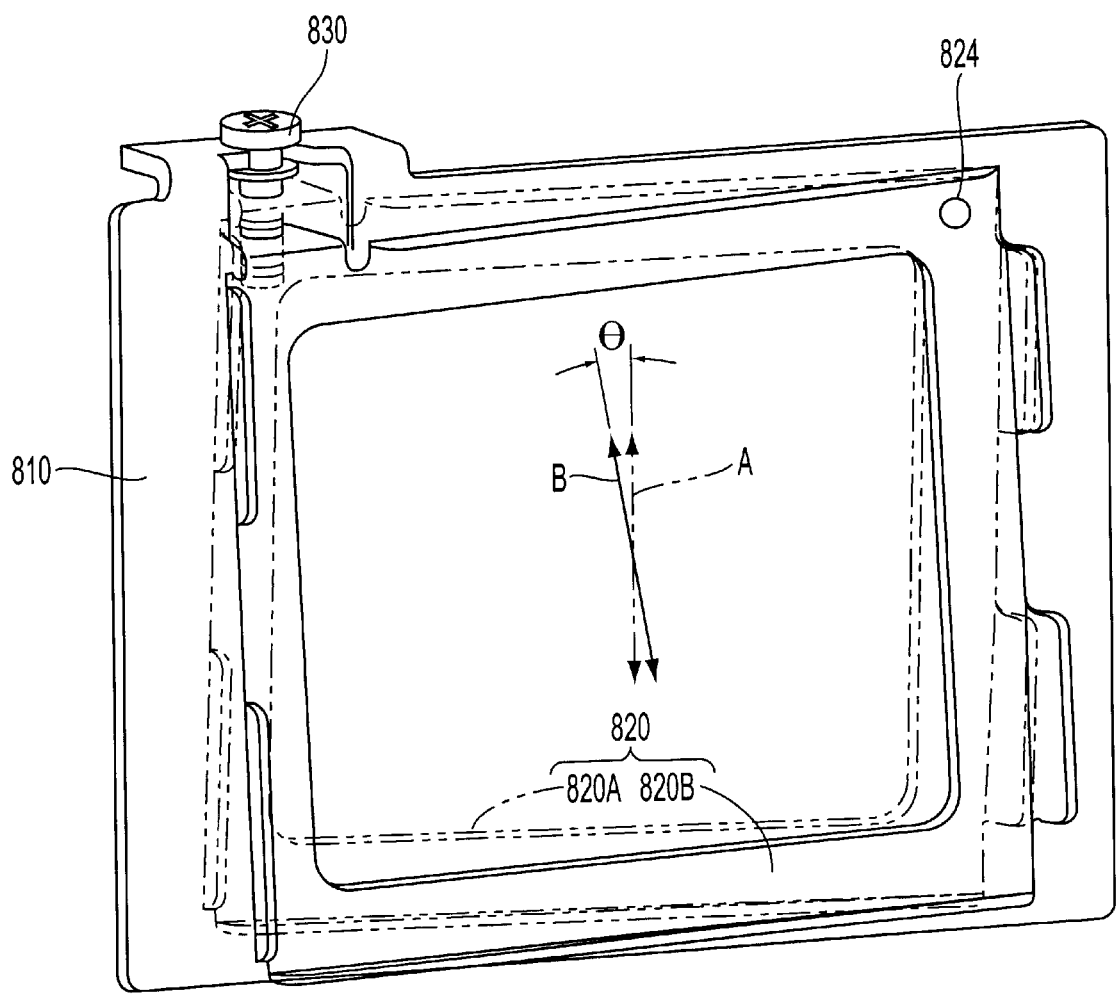
FIG. 9 is a front view showing the operation of the polarizer angle adjustment mechanism of the embodiment.

By turning the screw 830 in the polarizer angle adjustment mechanism 800 as shown in FIG. 8 and FIG. 9, the angle of the second frame 820 is adjusted. Specifically, when the screw 830 is clockwise rotated by $\alpha$ as shown in FIG. 8, a second frame 820A clockwise rotates by $\theta$ as shown in FIG. 9, and a polarization axis A of the input-side polarizer is accordingly pivoted. Similarly, when the screw 830 is counterclockwise rotated by $\beta$ as shown in FIG. 8, a second frame 820B counterclockwise rotates as shown in FIG. 9, and a polarization axis B of the input-side polarizer is accordingly pivoted. Since the loose engagement hole 816 is sufficiently larger than the diameter of the screw 830, the screw 830 suffers from no distortion in the pivotal motion of the above-described second frame 820.

Referring to FIG. 9, no particular limit is set on a range of pivot $\theta$, within which the second frame 820 is pivoted, and in this embodiment, the range of pivot is about 4 degrees.

Referring to FIG. 3, the polarizer angle adjustment mechanism 800 having the above operation mechanism is arranged on the light incident side of each of the liquid-crystal panels 925R, 925G, and 925B for the respective color light beams R, G and B. With the pivotal motion of the body 821, the polarization directions of the color light beams R, G and B respectively transmitted through the liquid-crystal panels 925R, 925G, and 925B are adjusted. Specifically, color light beams R, G, and B, which have undergone a proper adjustment of polarization directions, are transmitted through and are optically modulated by the liquid-crystal panels 925R, 925G, and 925B. After being transmitted through the output-side polarizers 961R, 961G, and 961B, the color light beams are synthesized by the prism unit 910 into a color image, and the color image is then projected and presented through the projection lens 6 to the outside.

(6) Advantages of the Embodiment

The above-described embodiment has the following advantages. Specifically, the projector 1 includes the polarizer angle adjustment mechanism 800, the second frame 820 having each of the input-side polarizers 960R, 960G, and 960B mounted thereon, is pivotally supported by the first frame 810 affixed to the upper and lower light guides 901 and 902, and the angular position of the second frame 820 is adjusted by the screw 830.

By turning the screw 830, the second frame 820 is pivoted about an axis of pivot, the polarization directions of the color light beams R, G, and B are properly adjusted in accordance with the orientations of liquid-crystal molecules, and a high-contrast and high-luminance image is thus projected and presented.

A simple operation, such as turning the screw 830, adjusts the angles of the polarization axes of the polarizers 960R, 960G, and 960B. Since the screw 830 is loosely inserted through the loose engagement hole 816 of the first frame 810, the displacement of the screw 830, taking place in the course of the pivotal motion of the second frame 820, is absorbed. Since no distortion occurs in the screw 830 with respect to the loose engagement lug 815, the screw 830 is allowed to turn smoothly.

Since the head 831 and the shoulder portion 833 restrain the displacement in the direction of the axis of the screw 830, the screw 830 is firmly maintained within the loose engagement hole 816.

Since the screw 830 is positioned farthest from the location of the projection 813 within the peripheral area of the second frame 820, the pivotal motion of the second frame 820 and thus of the polarizers 960R, 960G, and 960B is kept small in response to the stroke of the screw 830. The angle adjustment is thus precisely performed.

Since the tangential direction of the turning motion of the second frame 820 is aligned with the axial direction of the screw 830, the stroke of the screw 830 is directly converted into the pivotal motion of the second frame 820, and any intervening mechanism or part working between the screw 830 and the second frame 820 is not needed, and the structure of the screw 830 is thus simplified.

The first frame 810 and the second frame 820 are engaged with each other through a simple projection and recess engagement, and the machining of the frames is thus easily performed.

The second frame 820 has the flanges 823 on its edges. Among the flanges, the first flanges 823A on a pair of long sides of the rectangular frame are provided with the elastic members 840 having elasticity, and the glass plate 860, with each of the polarizers 960R, 960G, and 960B bonded thereon, is pressed and easily secured between the elastic members 840. When each of the polarizers 960R, 960G, and 960B is secured to the second frame 820 via the glass plate 860 having the polarizers 960R, 960G and 960B bonded thereto, no adhesive agent is used at all. There is no fear that any adhesive agent flows out into the light incident surface of each of the polarizers 960R, 960G, and 960B, and light incident on the polarizers is thus not disturbed.

Since the first frame 810 and the second frame 820 are held together by the clamping members 850, the second frame 820 is prevented from coming off, and is firmly attached to the first frame 810.

Since three small holes 901A (see FIG. 10) are formed in the upper light guide 901 (see FIG. 10) in alignment with the locations of the screws 830, the polarization axes of the input-side polarizers 960R, 960G, and 960B are properly pivoted by inserting a screwdriver through these small holes, rather than by demounting the upper light guide. The angle adjustment is thus easily performed.

(7) Modifications of the Embodiment

The present invention is not limited to the above embodiment, and includes the following modification.

In the polarizer angle adjustment mechanism 800, the two modifications, as described below, are contemplated as the clamping method of the first frame 810 and the second frame 820, and the mounting method of the glass plate 860 to the second frame 820.

Figure 11:
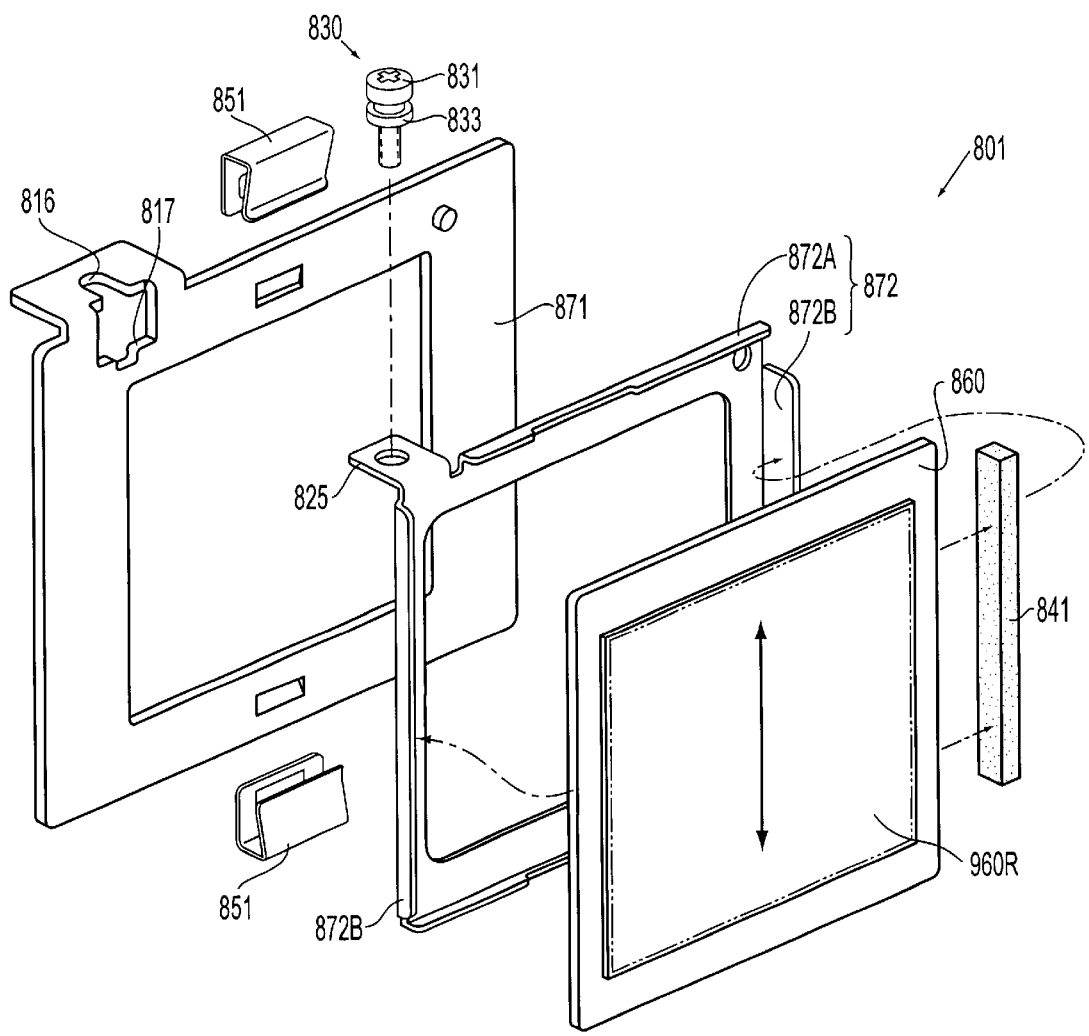
FIG. 11 is an exploded perspective view of the polarizer angle adjustment mechanism according to a first modification of the embodiment.

In a first modification, a single elastic member 841 arranged on one short side (on the right hand edge) of the glass plate 860 presses the glass plate 860 as shown in FIG. 11. A first frame 871 and a second frame 872 are clamped together by the clamping members 851 from below and above.

With this arrangement, the elastic member 841 is arranged on a flange portion 872B on the right hand side, and the glass plate 860 is engaged with the elastic member 841 with the right side of the glass plate 860 pressed against the elastic member 841 and the left side of the glass plate 860 pressed against the flange portion 872B. The glass plate 841 is thus affixed to the second frame 872. A screw 830 is screwed into a screw lug 825 until the loose engagement hole 816 is fitted between a head 833 and a shoulder portion 833 of the screw 830. The screw lug 825 is inserted into the opening 817. Finally, the first frame 817 and the second frame 872 are clamped together with clamping members 851 from below and above so that both frames do not come off.

In a polarizer angle adjustment mechanism 801, the clamping members 851 are attached to the first and second frames 871 and 872 from below and above. Thus no additional members are required on the left and right hand sides of the first frame 871, which permits a narrow horizontal dimension in the first frame 871, in contrast to the polarizer angle adjustment mechanism 800 which employs the clamping members 850 attached to the first and second frames 810 and 820 on the left and right hands. The width of the mounting area of the first frame 871 in the projector 1 is thus narrowed, and as a result, space saving is promoted in the design of the projector 1.

Figure 12:
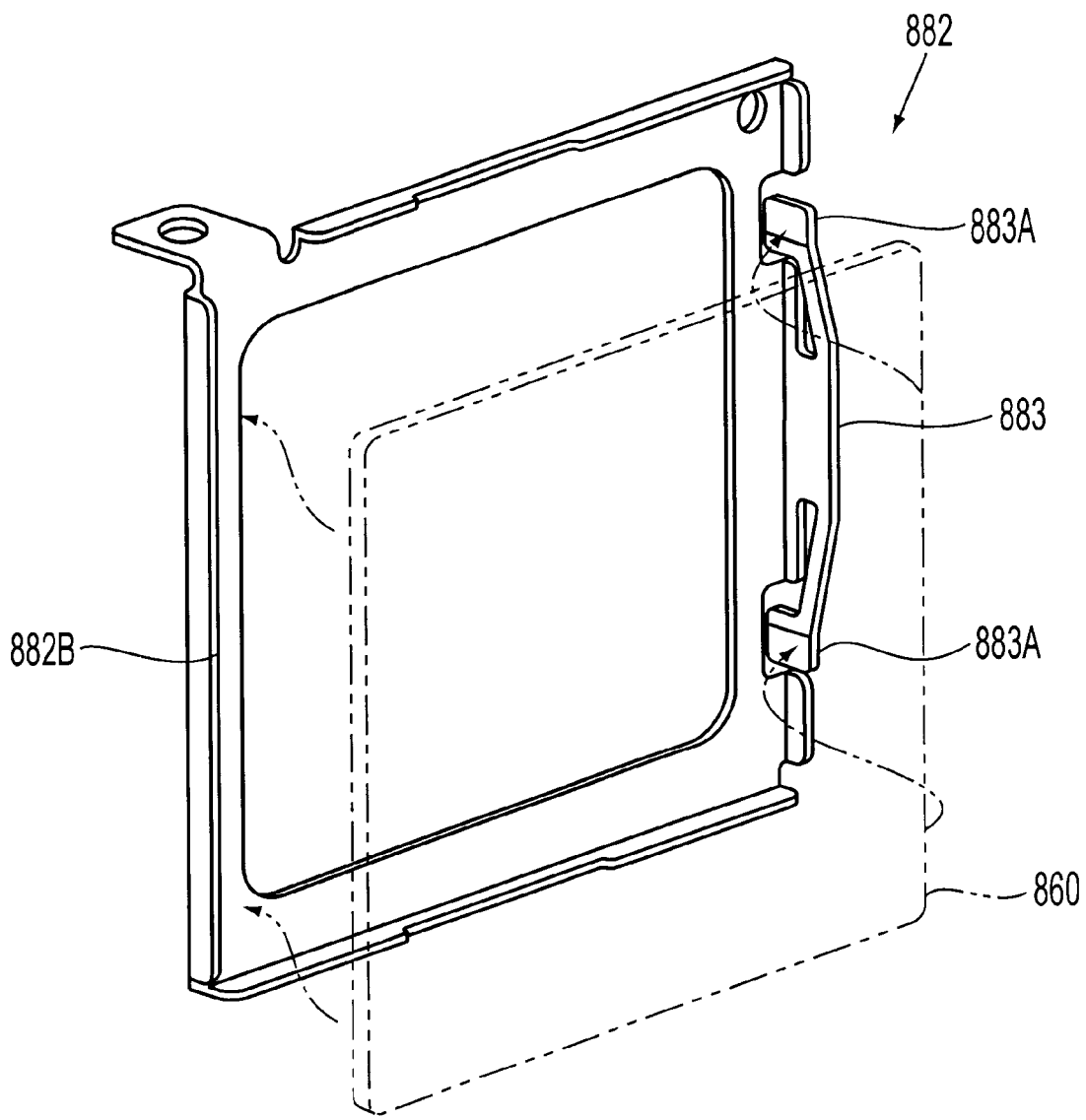
FIG. 12 is a perspective view of a second frame of the polarizer angle adjustment mechanism in accordance with a second modification of the embodiment.

In a second modification, a second frame 822 includes a spring 883 on its one edge (right hand edge), as shown in FIG. 12. Specifically, the spring 883 has pressure portions 883A on its upper and lower ends, instead of flange portions 823A and 872B in the preceding embodiment and the first modification. When a glass plate 860, having an input-side polarizer 960R bonded thereon, is mounted, one side-edge (right hand edge) of the glass plate 860 facing the spring 883 is pressed against the pressure portions 883A. While pressing, another edge (left hand edge) of the glass plate 860 is engaged with a flange portion 882B of the second frame 822. The glass plate 860 is thus affixed.

In this case, the glass plate 860 is affixed using the spring 883 integrally formed with the second frame 882, rather than employing the elastic members 840 and 841. Specifically, the glass plate 860 is affixed by the second frame 882 only, and the component count of the projector 1 is reduced.

In the preceding embodiment, for example, the polarizer angle adjustment mechanism 800 is arranged to adjust the polarization axis of each of the input-side polarizers 960R, 960G, and 960B. The present invention is not limited to this arrangement. Specifically, the polarizer angle adjustment mechanism 800 of the present invention may be arranged to adjust the polarization axis of each of the output-side polarizers 961R, 961G, and 961B. Alternatively, the polarizer angle adjustment mechanism 800 may be arranged to adjust the polarization angles of both of the input-side and output-side polarizers 960R and 961R, 960G and 961G, and 960B and 961B. In the preceding embodiment, the polarizer angle adjustment mechanism 800 is arranged to adjust the polarization axes of all of the three input-side polarizers 960R, 960G, and 960B. Alternatively, the polarizer angle adjustment mechanism 800 may be arranged to adjust the polarizer axis of one polarizer only.

In the preceding embodiment, the first frame 810 of the polarizer angle adjustment mechanism 800 is constructed of a member separate from the upper light guide and the lower light guide, but the present invention is not limited to this arrangement. Referring to FIG. 10, the first frame 810 may be integrally formed with the lower light guide 902, and the second frame 820 may be attached to the first frame 810 via an pivotal support so that the second frame can turn. Alternatively, the first frame 810 may be integrally formed with the upper light guide 901.

As for the mechanism construction and mounting position of the adjustment member 830 in the preceding embodiment, the axis-of-pivot portion is formed on one end of the long side and the screw 830 is arranged on the other end of the long side. The present invention is not limited to this arrangement. For instance, the axis-of-pivot portion and the screw 830 may be arranged in diagonally opposite positions of the frame. In short, they can be positioned anywhere as long as they remain clear of the polarizers 960R, 960G, and 960B. The mechanism construction of the adjustment member may include worm gears, rack and pinion gears, and a link mechanism.

The structure of the screw 830 is not limited to the preceding embodiment. For instance, instead of the shoulder portion 833, an annular recess may be formed near the head 831, and the annular recess is engaged with the loose engagement hole 816.

The shapes and materials of the first frame 810 and the second frame 820 are not limited to the above-described rectangular shape and metal. Specifically, the frame may be circular or polygonal or of other shape, and the material is not limited to the metal. For instance, the material may be a high temperature resistance synthetic resin, such as polyimide resin.

The method of mounting the glass plate 860 to the second frame 820 is not limited to the preceding embodiment. For instance, instead of the elastic members 840, an adhesive agent may be used to directly attach the glass plate 860 to the second frame 820.

The pivotal support mechanism and pivotal motion range of the second frame 820 with respect to the first frame 810 may be appropriately set. In the preceding embodiment, the pivotal support mechanism is the projection and recess engagement. The present invention is not limited to this arrangement. The same diameter hole may be drilled in the first frame 810 and the second frame 820 to join them by a pin therethrough. The pivotal motion range θ is about 4 degrees in the preceding embodiment, but may be appropriately set in consideration of the orientation of liquid-crystal molecules and the size of the second frame 820.

In the preceding embodiment, the electrooptic device 925 is constructed of the TFT-driven liquid-crystal panels 925R, 925G, and 925B. The present invention is not limited to this arrangement, and may be implemented in a projector constructed of an electrooptic device operating in another driving method.

In the preceding embodiment, the electrooptic device 925 is constructed of three liquid-crystal panels 925R, 925G, and 925B. The present invention is not limited to this arrangement, and may be implemented in an electrooptic device constructed of a single liquid-crystal panel or two liquid-crystal panels.

The polarizer angle adjustment mechanism in the preceding embodiment may serve as an angle adjustment mechanism for a reflective polarizer that reflects one linear polarized light rather than absorbing it, a half-wavelength plate, a quarter-wavelength plate, and another optical polarizing element in need of adjustment of a polarization axis and optical axis thereof.

The specific structure and shape in the implementation of the present invention may be different from the above-described ones as long as the aspects of the present invention are achieved.

The above-described projector of the present invention may include an adjustment mechanism for adjusting a mounting angle of a optical polarizing element including the two frames and the adjustment member, arranged in the vicinity of the electrooptic device. The optical polarizing element is supported by one of the two frames, one of the two frames is pivotally supported at an axis of pivot with respect to the other of the two frames so that it can turn, and one of the two frames is pivoted about the axis of pivot with respect to the other of the two frames through the adjustment operation of the adjustment member. By properly adjusting the adjustment member, the angle of the polarization axis or the optical axis of the optical polarizing element such as the polarizer is adjusted to an optimum angle, and a high-contrast and high luminance image is thus presented.

What is claimed is:

1. A projector comprising:

a light source;

an electrooptic device that forms an optical image from light emitted from the light source in accordance with image information;

a projection lens that enlarges and projects the image formed by the electrooptic device;

an optical polarizing element interposed between the light source and the electrooptic device, a predetermined polarized light transmitted through the optical polarizing element being modulated by the electrooptic device; and a single adjustment mechanism that adjusts a mounting angle of an optical polarizing element, the adjustment mechanism comprising two frames, the optical polarizing element being supported by one of the two frames, one of the two frames being pivotally supported on a pivoting axis so that it can turn independently in relation to the other of the two frames, and an adjustment member that adjusts to pivot one of the two frames about the pivoting axis with respect to the other of the two frames, a direction of an axis of the adjustment member is aligned parallel to a tangential direction of a pivotal motion of the one of the two frames.

2. The projector according to claim 1, the adjustment member being a screw, and the screw being screwed into the one of the two frames while being inserted through the other of the two frames.

3. The projector according to claim 2, the frame through which the screw is inserted comprising a loose engagement portion, the screw having a shoulder portion, and the loose engagement portion being held between a head of the screw and the shoulder portion.

4. The projector according to claim 2, a direction of an axis of the screw being aligned with a tangential direction of a pivotal motion of the one of the two frames.

5. The projector according to claim 1, one of the two frames having a projection toward the other of the two frames, the other of the two frames having a recess formed in a position in alignment with the projection, and the one of the two frames being pivotally supported by the other of the two frames through the engagement of the recess and the projection.

6. The projector according to claim 5, one of the two frames has flange portions formed on the periphery of the frame, and elastic members for pressing the optical polarizing element with elasticity is interposed between the flange portion and the end faces of the optical polarizing element.

7. The projector according to claim 6, comprising clamping members for clamping the two frames together.

8. The projector according to claim 1, comprising a case for covering the adjustment mechanism, an opening being formed at a location of the case facing the adjustment member.

9. The projector according to claim 1, comprising a case for covering the adjustment mechanism, the case being integrally formed with one of the two frames.

10. A projector, comprising:

a light source;

an electrooptic device that forms an optical image from light emitted from the light source in accordance with image information;

a projection lens that enlarges and projects the image formed by the electrooptic device;

an optical polarizing element interposed between the electrooptic device and the projection lens, a predetermined polarized light transmitted through the optical polarizing element being projected through the projection lens; and a single adjustment mechanism that adjusts a mounting angle of an optical polarizing element, the adjustment mechanism comprising two frames, the optical polarizing element being supported by one of the two frames, one of the two frames being pivotally supported on a pivoting axis so that it can turn independently in relation to the other of the two frames, and an adjustment member that adjusts to pivot one of the two frames about the pivoting axis with respect to the other of the two frames, a direction of an axis of the adjustment member is aligned parallel to a tangential direction of a pivotal motion of the one of the two frames.

11. The projector according to claim 10, the adjustment member being a screw, and the screw being screwed into the one of the two frames while being inserted through the other of the two frames.

12. The projector according to claim 11, the frame through which the screw is inserted comprising a loose engagement portion, the screw having a shoulder portion, and the loose engagement portion being held between a head of the screw and the shoulder portion.

13. The projector according to claim 11, a direction of an axis of the screw being aligned with a tangential direction of a pivotal motion of the one of the two frames.

14. The projector according to claim 10, one of the two frames having a projection toward the other of the two frames, the other of the two frames having a recess formed in a position in alignment with the projection, and the one of the two frames being pivotally supported by the other of the two frames through the engagement of the recess and the projection.

15. The projector according to claim 10, one of the two frames has flange portions formed on the periphery of the frame, and elastic members for pressing the optical polarizing element with elasticity is interposed between the flange portion and the end faces of the optical polarizing element.

16. The projector according to claim 10, comprising clamping members for clamping the two frames together.

17. The projector according to claim 10, comprising a case for covering the adjustment mechanism, an opening being formed at a location of the case facing the adjustment member.

18. The projector according to claim 10, comprising a case for covering the adjustment mechanism, the case being integrally formed with one of the two frames.

* * * * *